US006945292B1

(12) United States Patent
Giles et al.

(10) Patent No.: US 6,945,292 B1
(45) Date of Patent: Sep. 20, 2005

(54) TREE HARVESTING APPARATUS

(75) Inventors: Richard Courthope Giles, Dwellingup (AU); Harley Lawson Pederick, Wagin (AU)

(73) Assignee: Oil Mallee Company of Australia, Belmont (AU)

( * ) Notice: Subject to any disclaimer, the term of this patent is extended or adjusted under 35 U.S.C. 154(b) by 0 days.

(21) Appl. No.: 09/936,280

(22) PCT Filed: Mar. 10, 2000

(86) PCT No.: PCT/AU00/00171

§ 371 (c)(1),
(2), (4) Date: Aug. 13, 2002

(87) PCT Pub. No.: WO00/52998

PCT Pub. Date: Sep. 14, 2000

(30) Foreign Application Priority Data

Mar. 10, 1999 (AU) .................................. PP9126

(51) Int. Cl.[7] .......................................... A01G 23/08
(52) U.S. Cl. ..................... 144/337; 144/373; 144/4.1; 144/34.1; 144/242.1
(58) Field of Search ............................... 144/334, 335, 144/336, 337, 4.1, 34.1, 24.12, 363, 373; 241/91–93, 241/296

(56) References Cited

U.S. PATENT DOCUMENTS

| 4,057,192 | A | * | 11/1977 | Smith | 241/92 |
| 4,338,985 | A | * | 7/1982 | Smith et al. | 144/34.1 |
| 4,784,195 | A | * | 11/1988 | Eggen | 144/337 |
| 5,819,825 | A | * | 10/1998 | Lyman et al. | 144/174 |
| 6,026,869 | A | * | 2/2000 | Holmes | 144/4.1 |

FOREIGN PATENT DOCUMENTS

DE            3141940        * 10/1981

* cited by examiner

*Primary Examiner*—Derris H. Banks
*Assistant Examiner*—Shelley Self
(74) *Attorney, Agent, or Firm*—Bromberg & Sunstein LLP

(57) ABSTRACT

Tree harvester (10) is mounted on tractor (12) to enable continuously cutting and chipping of trees. The harvester (10) includes a rotary saw (14) for cutting a tree near ground level, transport means (16) adjacent the rotary saw (14) for gripping a tree cut by the rotary saw (14) and transporting the tree to and dropping the cut tree in a chipper (18) located at an end of the transport means (16) distant the rotary saw (14). The transport means (16) includes first and second opposed conveyors (46, 48) each provided with laterally extending fingers (50) so that a cut tree can be gripped by the fingers (50) of the opposed conveyors (46, 48) and subsequently transported therebetween to the chipper (18).

39 Claims, 8 Drawing Sheets

200~# TREE HARVESTING APPARATUS

FIELD OF THE INVENTION

The present invention relates to a tree harvesting apparatus particularly suited for mounting on a vehicle to enable continuous tree harvesting.

BACKGROUND TO THE INVENTION

The present invention was initially developed to attempt to provide a cost effective way for harvesting the leaves of a mallee tree for the production of mallee oil. Manual harvesting of the leaves is possible however this is seen as not economically viable. The Applicant therefore set out to develop an apparatus or machine that, in operation, could form part of a larger process culminating in the separation of the mallee leaves from the mallee tree.

It is known to harvest small trees in Europe, particularly Sweden, using a modified cane harvester made by an Australian company and modified forage harvesters made by a German company. The trees harvested are about 3 meters tall and being deciduous and cut in Winter, have no leaves.

However, the range of mallee forms is difficult to handle with existing harvesters.

The cane harvester blocks up readily and the cutting mechanism is under the machine instead of out the front. It is designed to push the cane over before cutting and the cutting elements are five bladed discs with a very aggressive chopping action.

The Claas forage harvester cuts and chips out the front, but is has a lightweight agricultural chipper, it lays the trees down in front of the saws after cutting, is prone to dropping cut stems and suffers blockages with bushy forms.

In parts of Australia, mallees are harvested with flail cutters (a mower style, but heavily built) but the mallees are short and flexible so the harvester can pass over them before cutting without dislodging the stumps. As the mallees are small it is not possible to travel fast enough to harvest a practical amount per hour and harvest costs per tonne are high.

BRIEF SUMMARY OF THE INVENTION

According to the present invention there is provided a tree harvesting apparatus adapted for mounting on a vehicle to effect continuous tree harvesting, said apparatus including:
 a rotary saw for cutting a tree near ground level;
 transport means adjacent said saw for gripping a tree cut by the saw and transporting the tree to and dropping said cut tree in a chipping means located at an end of the transport means distant the rotary saw for chipping the tree, said chipping means being provided with a rotary chipping drum and a controllably moveable anvil adjacent said chipping drum for directing a cut tree entering said chipping means onto said chipping drum, the anvil being moveable to vary the angle of incidence of the tree onto the chipping drum;
 whereby, in use, when said tree harvesting apparatus is mounted on the vehicle and said vehicle driven along a row of trees, said apparatus can continuously cut and chip said trees.

If the above apparatus is used in relation to Mallee trees, the chipped trees can then be passed through a winnowing machine to separate the leaves from the chipped wood. Oil can then be extracted from the leaves using processes that do not form part of this invention.

Preferably said saw is rotated in a direction to urge said cut tree into said transport means.

Preferably the transport means transports said cut tree in a substantially upright orientation along and inclined path to said chipping means.

Preferably the inclined path extends to one side of the vehicle to which said apparatus is mounted so that said cut trees do not substantially block the line of sight of a driver of the vehicle.

Preferably said rotary saw is a rotary circular saw and is disposed in an inclined plane so that a leading edge of the saw is near ground level and below a trailing edge of the saw.

Preferably said rotary circular saw has a dished or convexly curved bottom surface for reducing possible contact area between the bottom surface of the saw and the ground.

Preferably said transport means includes first and second opposed conveyor means each provided with laterally extending fingers so that a cut tree is gripped by the fingers of the opposed conveyor means.

Preferably said first conveyor means comprises a first endless loop chain from which a plurality of said fingers extend, and said second conveyor means comprises second and third endless chains from each of which a plurality of said fingers extend, said second and third endless chains vertically spaced from each other and wherein the first endless chain is located vertically intermediate said second and third endless chains.

Preferably said second conveyor means is coupled to a floating frame that allows said second conveyor means to move relative to said first conveyor means.

Preferably said floating frame is arranged to allow said second conveyor means to fish tail.

Preferably said floating frame is further arranged to allow lateral sliding motion of said second conveyor means relative to said first conveyor means.

Preferably said apparatus further includes height adjusting means for adjusting the height of said saw above the preferred level.

DETAILED DESCRIPTION OF THE PREFERRED EMBODIMENT

An embodiment of the present invention will now be described by way of example only with reference to the accompanying figures in which.

Figure 1:
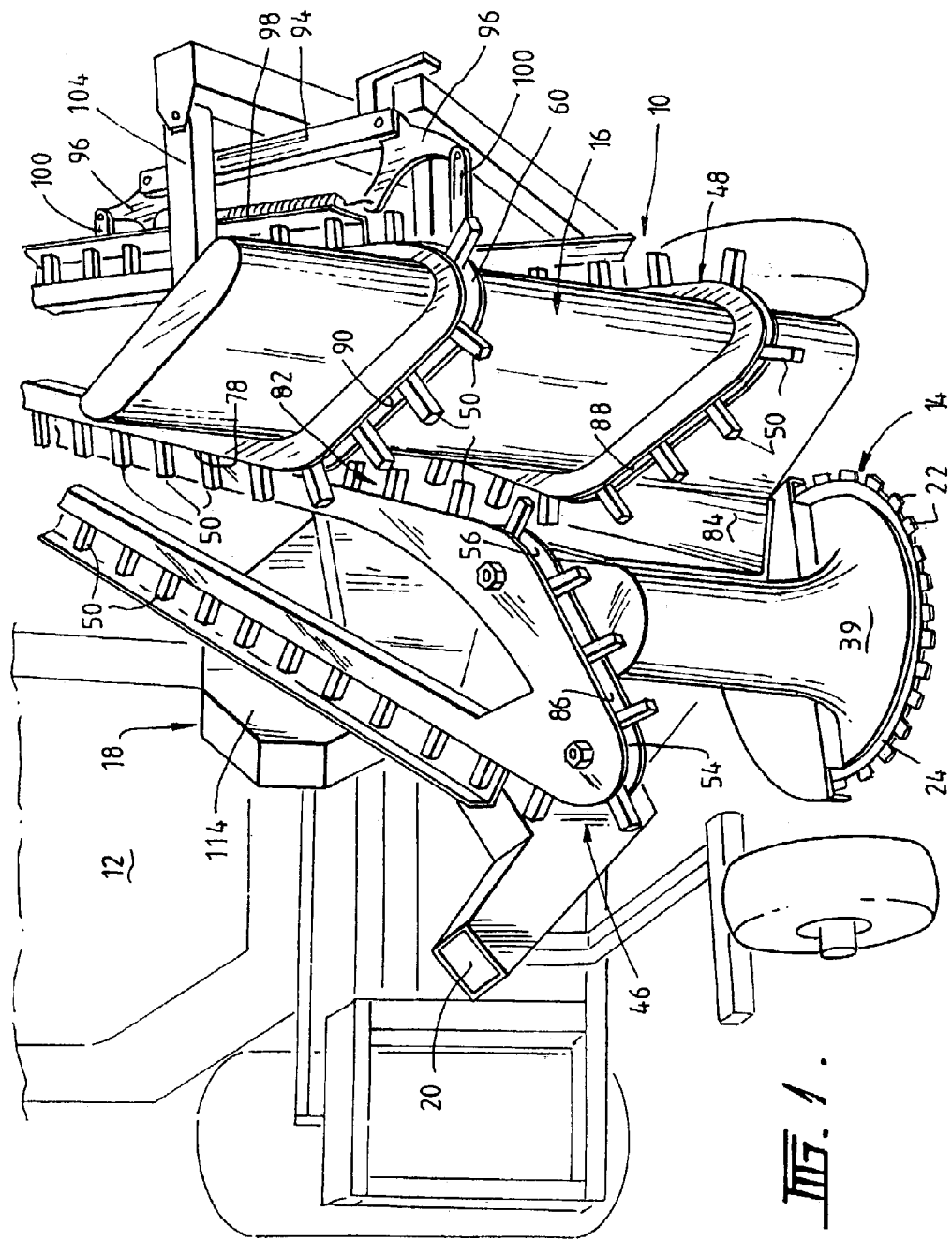
FIG. 1 is a copy of a photograph of an embodiment of the tree harvesting apparatus mounted on a tractor.

Referring to FIG. 1, a tree harvesting apparatus 10 in accordance with an embodiment of this invention is shown mounted on the front of a vehicle in the form of tractor 12. The tree harvesting apparatus 10 includes a rotary circular saw 14 for cutting a tree near ground level, a transport means 16 adjacent the saw 14 for gripping a tree cut by the saw 14 and transporting the tree to, and dropping the cut tree in, a chipping means in the form of a chipper 18 located at an end of the transport means 16 distant the rotary saw 14. The tree harvesting apparatus 10 mounted on the tractor 12 can be driven through a row of trees to effect continuous tree harvesting in which the saw 14 initially cuts the tree near ground level, the transport means 16 transports the cut-tree to, and drops it in, the chipper 18 which chips the trees. Essentially the whole of the tree is chipped including branches and leaves. The chipper 18 has a chute 20 for ejecting the chips into a collection bag or bin towed or otherwise carried by the tractor 12. When the apparatus 10 is used in relation to mallee trees, the leaves can be separated from the chipped wood of the tree by conventional means such as winnowing. From there, oil can be extracted from the leaves using known processes that do not form part of this invention.

Figure 2:
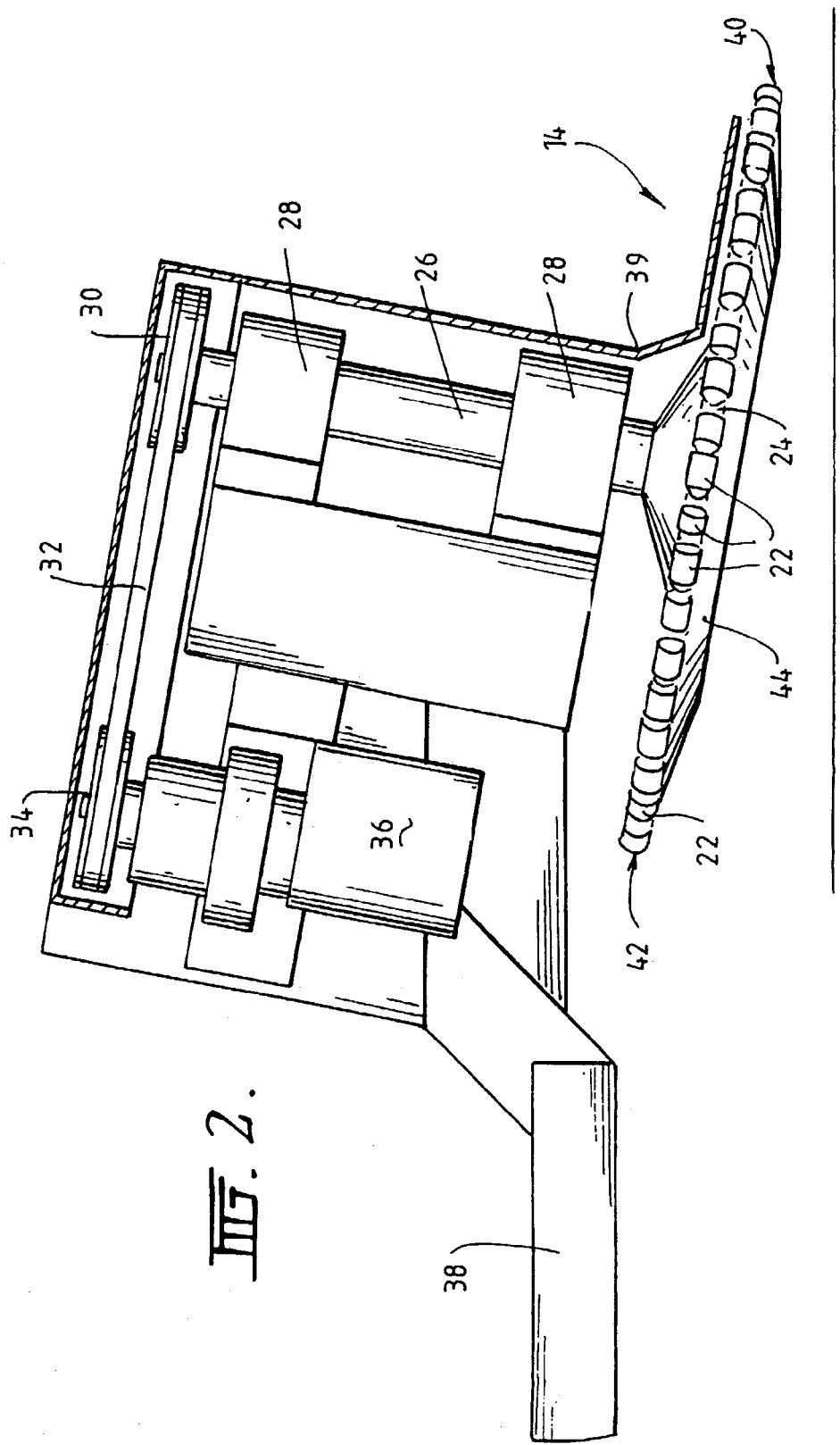
FIG. 2 is a schematic representation from the side of a rotary circular saw incorporated in the apparatus shown in FIG. 1.
Figure 3:
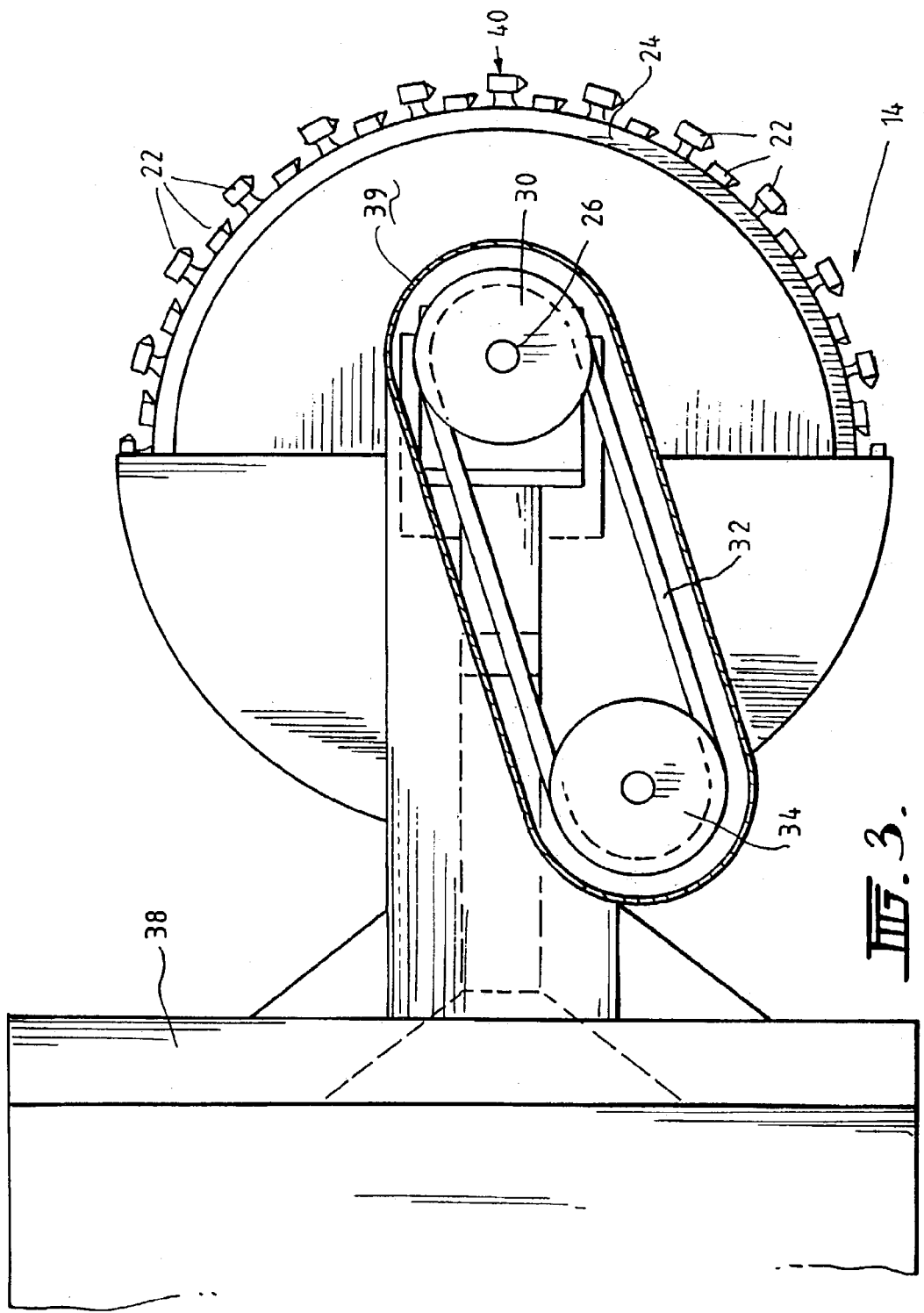
FIG. 3 is a top view of the saw shown in FIG. 2.

Referring to FIGS. 2 and 3, it can be seen that the rotary saw 14 is a circular type saw having a plurality of teeth 22 releasable attached about the periphery of a rotary disk 24. The teeth 22 are conventional replaceable teeth. The disk 24 is attached to a shaft 26 supported about its upper and lower ends by bearings 28. A pulley 30 (refer to FIG. 3) is fixed to the top of the shaft 26 and is coupled by a belt 32 to a second pulley 34 which in turn is fixed to a hydraulic motor 36. The hydraulic motor 36 is plumbed into the hydraulic system of the tractor 12. The saw 14 and hydraulic motor 36 are supported on a sub-flame 38 that in turn is mounted on the tractor 12. The saw 14 and hydraulic motor 36 are supported on a sub-frame that in turn is mounted on the tractor 12. A guard 39 is provided over the disk 24 to ensure that the cut stem/trunk of the tree does not sit or bear on the disk 24. This reduces friction on the disk 24 thereby reducing power requirements.

As is most apparent from FIG. 2, the saw 14, and in particular the saw disk 24, is disposed in an inclined plane so that a leading (cutting) edge 40 is nearest ground level and below trailing edge 42 of the saw 14. Additionally, the bottom of the circular saw 14, and more specifically the disk 24 has a dished or convexly curved bottom of the surface 44. The inclining of the saw 14 and shaping of the bottom of the surface 44 is provided to reduce possible contact area between the bottom of the surface 44 and the ground. The reasons for this is to minimise the wear of the saw 14. The saw is rotated in a direction (in this embodiment anticlockwise) to urge the cut tree to the transporter 16.

Figure 4:
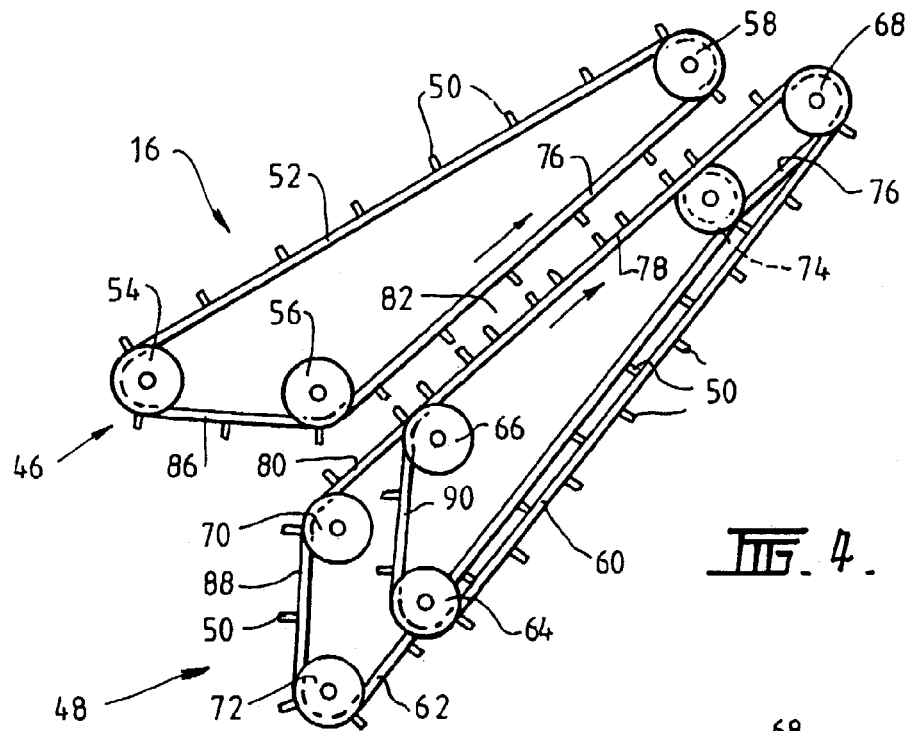
FIG. 4 is a schematic representation in plan view of an elevator incorporated in the apparatus shown in FIG. 1.

The transport means (referred to in general as "the transporter") 16 includes first and second opposed conveyor means 46, 48 (see FIG. 4), each provided with laterally extending fingers 50 so that a cut tree can be gripped by the fingers 50 of the opposed conveyors 46, 48 and subsequently transported therebetween to the chipper 18.

The first conveyor 46 is in the form of an endless loop chain 52 from which a plurality of the fingers 50 extend. The chain 52 travels around a substantially triangular path. The triangular path is formed by two idler sprockets 54 and 56 and a drive sprocket 58 that provides the drive to cause the chain 52 to travel about the triangular path.

Figure 5:
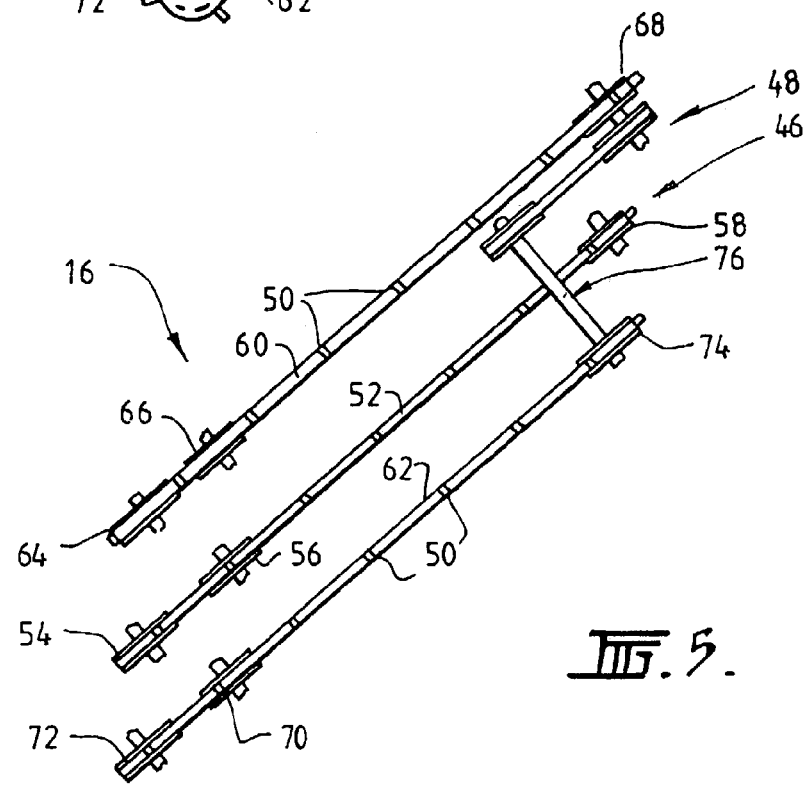
FIG. 5 is a side view of the elevator shown in FIG. 4.
Figure 6:
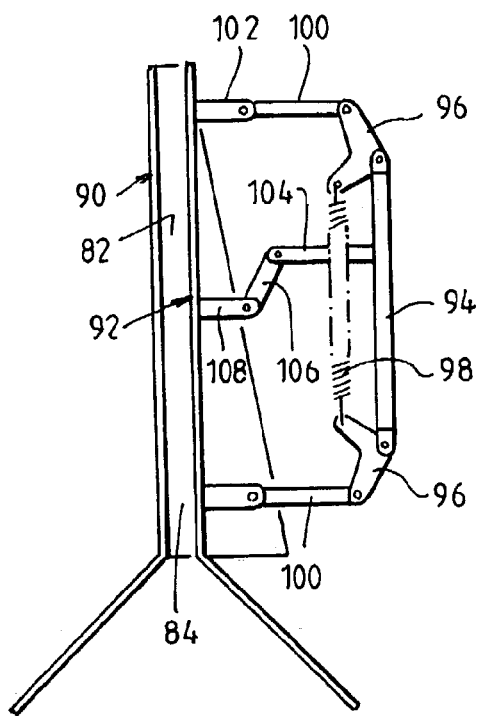
FIG. 6 is a schematic representation in plan view of a supporting frame for the elevator shown in FIGS. 4 and 5.

The second conveyor 48 comprises second and third endless loop chains 60 and 62 from each of which a plurality of the fingers 50 extend. The second and third endless chains 60 and 62 are vertically spaced from each other with the first chain 52 being located vertically intermediate the chains 60 and 62 as is clearly shown in FIG. 5. Both the chains 60 and 62 travel in triangular paths. The path of the chain 60 is described by idler sprockets 64 and 66 and drive sprocket 68. The triangular path of chain 62 is described by idler sprockets 70 and 72 and drive sprocket 74. Each of the triangular paths of chains 52, 60 and 62 are in inclined planes.

The drive sprockets 68 and 74 of the chains 60 and 62 are geared together in a 1 to 1 ratio by a transmission 76. Chain 52 is driven in an anticlockwise direction and chains 60 and 62 are driven in a clockwise direction so that the run 76 of chain 52, and adjacent runs 78 and 80 of chains 60 and 62 respectively are all moving in the direction from the saw 14 to the chipper 18. The region between the runs 76, 78 and 80 defines an inclined path 82 up along which a cut tree is transported prior to dropping into the chipper 18. A skid pan or base 84 is formed underneath the path 82 to support a base of the cut tree. The shortest run 86 of chain 52 extending between idler rollers 54 and 56 converges with the shortest run 88 of chain 80 extending between idler rollers 70 and 72, and the shortest run 90 of chain 78 extending between idler rollers 64 and 66 to form a throat leading into the inclined path 82.

The first conveyor 46 is mounted on a frame 90 (refer to FIGS. 6–9) that in turn, is mounted to the tractor 12 via sub-frame 38. The frame 90 also supports the base 84 on which the base of a cut tree can be supported while being transported up the transporter 16.

The second conveyor 48 is mounted on a floating frame 92 that in turn is supported by the tractor 12 via sub-frame 38. The floating frame 92 is able to fishtail those shown in FIGS. 7 and 8 and also able to slide laterally as depicted in FIG. 9. To facilitate this movement, the frame 92 is coupled by a variety of links to a support beam 94 that is fixed to the sub-frame 38. A bell crank 96 is pivotally coupled at each end of the support beam 94. Adjacent arms of the respective bell cranks 96 are coupled by a spring 98. The other arm of each bell crank 96 is coupled by respective first and second arms 100 and 102 to the frame 92. The arm 100 is pivotally connected at one end to the corresponding bell crank 96 and pivotally connected at its opposite end to the adjacent arm 102. The opposite end of arm 102 is fixed to the frame 92. Between each bell crank 96, there is a further link between the frame 92 and the support beam 94 provided by arms 104, 106 and 108. The arm 104 extends perpendicularly from bar 94 toward the frame 92 and is fixed at its end adjacent the beam 94. The opposite end of arm 104 is permanently coupled to arm 106. The opposite end of arm 106 is permanently coupled to one end of arm 108. The opposite end of arm 108 is fixed to the frame 92 and extends perpendicularly therefrom.

Figure 7:
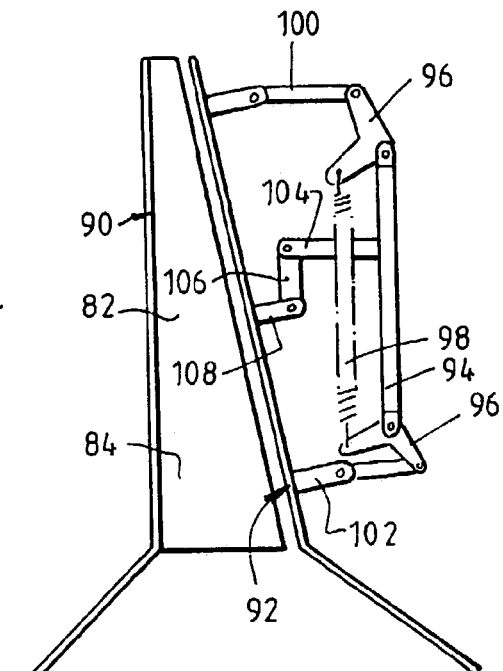
FIGS. 7, 8 & 9 illustrate various configurations of the frame shown in FIG. 6 when the apparatus is in use.
Figure 8:
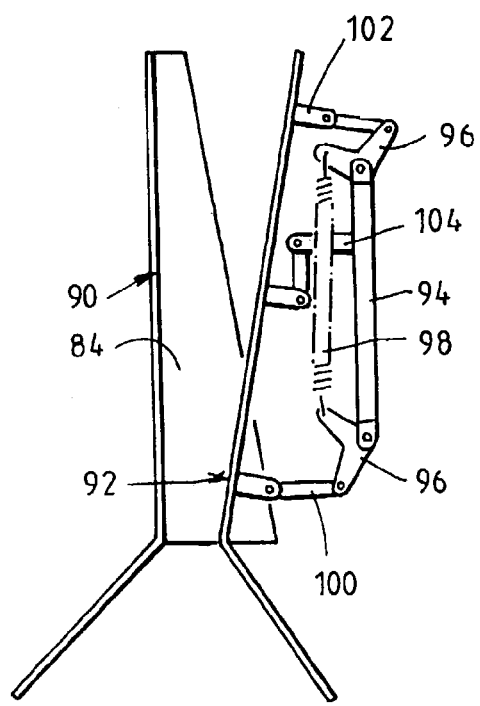
Figure 9:
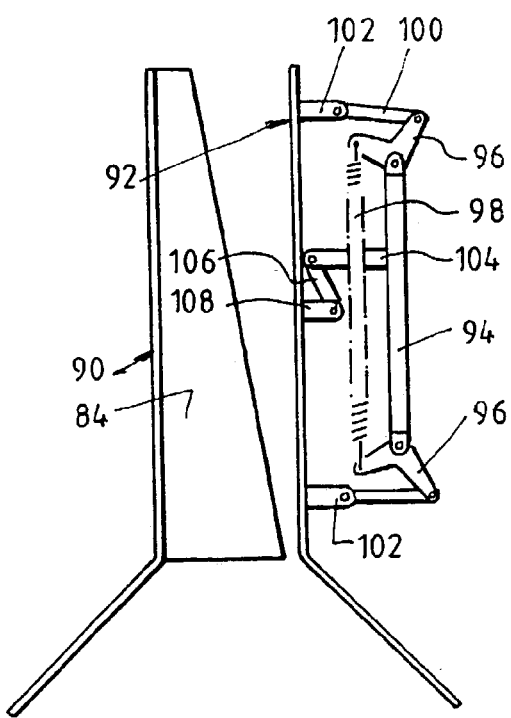

By virtue of this coupling, the frame 92 can fishtail relative to the frame 90 as depicted in FIGS. 7 and 8. Also, as depicted in FIG. 9, the frame 92 can slide laterally off frame 90. This motion allows the floating frame 92 to move around a tree as it is transported along inclined path 82 toward the chipper 18.

Figure 10:
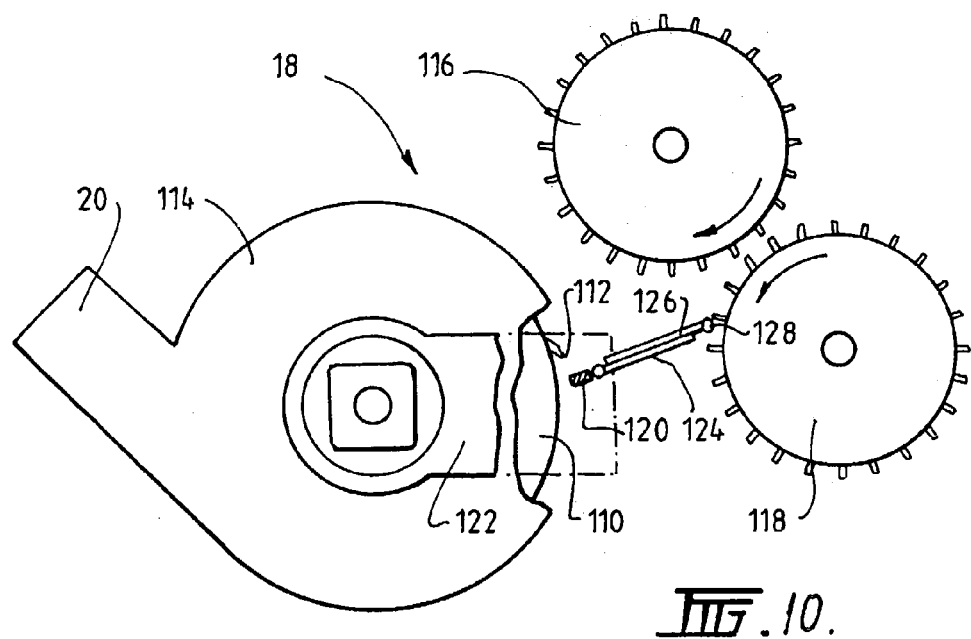
FIG. 10 is a partial schematic representation of a chipper incorporated in the apparatus when in a first configuration.

The chipper 18 is in the form of a drum chipper (refer to FIGS. 10 and 11) having a conventional rotating chipping drum 110 provided with a cutting blade 112. The drum 110 is rotatably mounted in a chipper housing 114 which also formes the chute 20. A pair of counter rotating feed rollers 116 and 118 are provided to one side of the drum 110. A tree cut by the saw 14 and transported by the transporter 16 is dumped into the chipper 18 so that it initially passes between the counter rotating feed rollers 116 and 118 which in turn push the tree against the from 110. The drum 110, and rollers 116 and 118 are of essentially conventional construction and form. However, the chipper 18 differs from conventional known chippers by the inclusion of a moveable anvil 120. Movement of the anvil 120 controls the angle of incidence of the cut tree to the drum 110. This variation in angle may be from close to square on (shown in FIG. 10) where a tree extends almost radially from the drum 110 to near tangential (shown in FIG. 11).

Figure 11:
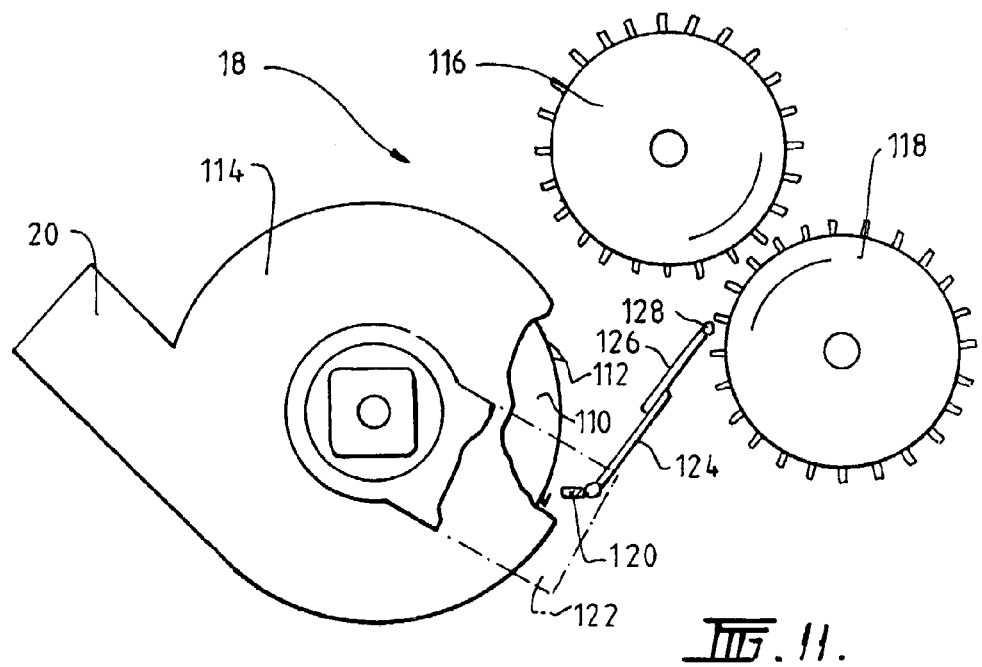
FIG. 11 is a partial schematic representation of the chipper in a second configuration.

The anvil 120 is fixed to a pivot arm 122 that can be rotated about the rotational axis of the drum 110. A pair of telescopically related plates 124 and 126 extend from the anvil 120 to a point 128 located between rollers 116 and 118 but closest to roller 118. Plate 126 is pivoted at point 128 and plate 124 is pivoted adjacent the anvil 120. This allows the plates 124 and 126 to telescope toward and away from each other as the arm 122 is pivoted in the anti-clockwise and clockwise directions respectively. The plates 124 and 126 form a guide and support for the cut tree as it is being chipped by the chipping drum 110. When pivot arm 122 is pivoted in the clockwise direction, the plates 124 and 126 can be telescoped away from each other to the maximum extent as shown in FIG. 11, so that they run approximately tangentially to drum 110 and roller 118. The angle of the pivot arm 122 and thus the position of the anvil 120 can be varied by use of a hydraulic or pneumatic ram or an electric screw jack, or any other conventional means. The ability to move the position of the anvil 120 and thus adjust angle of incidence of the tree to the chipping drum 110 enables the apparatus 10 to be used for a large variety of trees. This is because different trees have different physical characteristics which dictate the optimum instant angle for chipping. In particular reference to mallee trees, the provision of the adjustable chipper 18 enables highly efficient harvesting over the full range of mallee trees as it allows separation of all leaves from the twigs whilst minimising leaf damage and producing the largest possible wood chips. These requirements work against each other. Severe chipping breaks all leaves from the twigs but also causes more leaf damage (resulting in evaporation of oil from the leaves); produces a high proportion of very small wood chips (which are difficult to separate from the leaves and are not desirable for other uses); and consumes more power from the harvester and increases chipper maintenance costs.

A typical operating cycle of the apparatus 10 will now be described.

With the apparatus 10 mounted on a tractor 12, the tractor 12 is driven along or through a row of tree (not shown). As the apparatus 10 approaches the first tree, the saw 14 cuts the trunk off the tree near ground level. It is preferred that the cut be made as close as ground level as possible but not so close so that there is contact between saw 14 and the ground. Referring to FIG. 1, the saw 14 is rotated in the anti-clockwise direction so as to effectively direct the cut tree in between the first and second conveyors 46 and 48 of the transporter 16. The tree is gripped between the fingers 50 that extend from the endless chains 52, 60 and 62 and directed up the inclined path 82. The bottom of the cut tree may slide along the base 84. The tree is transported in a substantially upright or vertical orientation. When it reaches the end of the inclined path 82, it is dropped into the chipper 18. The cut end of the tree is gripped by and between the rollers 116 and 118 and forced onto the drum 110. The angle of incidence of the tree onto the drum 110 can be adjusted by pivoting the arm 122 in a clockwise or anti-clockwise to raise or lower the anvil 120. The tree is then wholly chipped with the chips ejected from the chute 20 into a container (not show). It is envisaged that while one tree is being chipped by the chipper 18 another is being cut by the saw 14. In this way, the tractor 12 can be driven at a continuous pace through a line of trees to sequentially and continuously cut and chip the trees.

Figure 12:
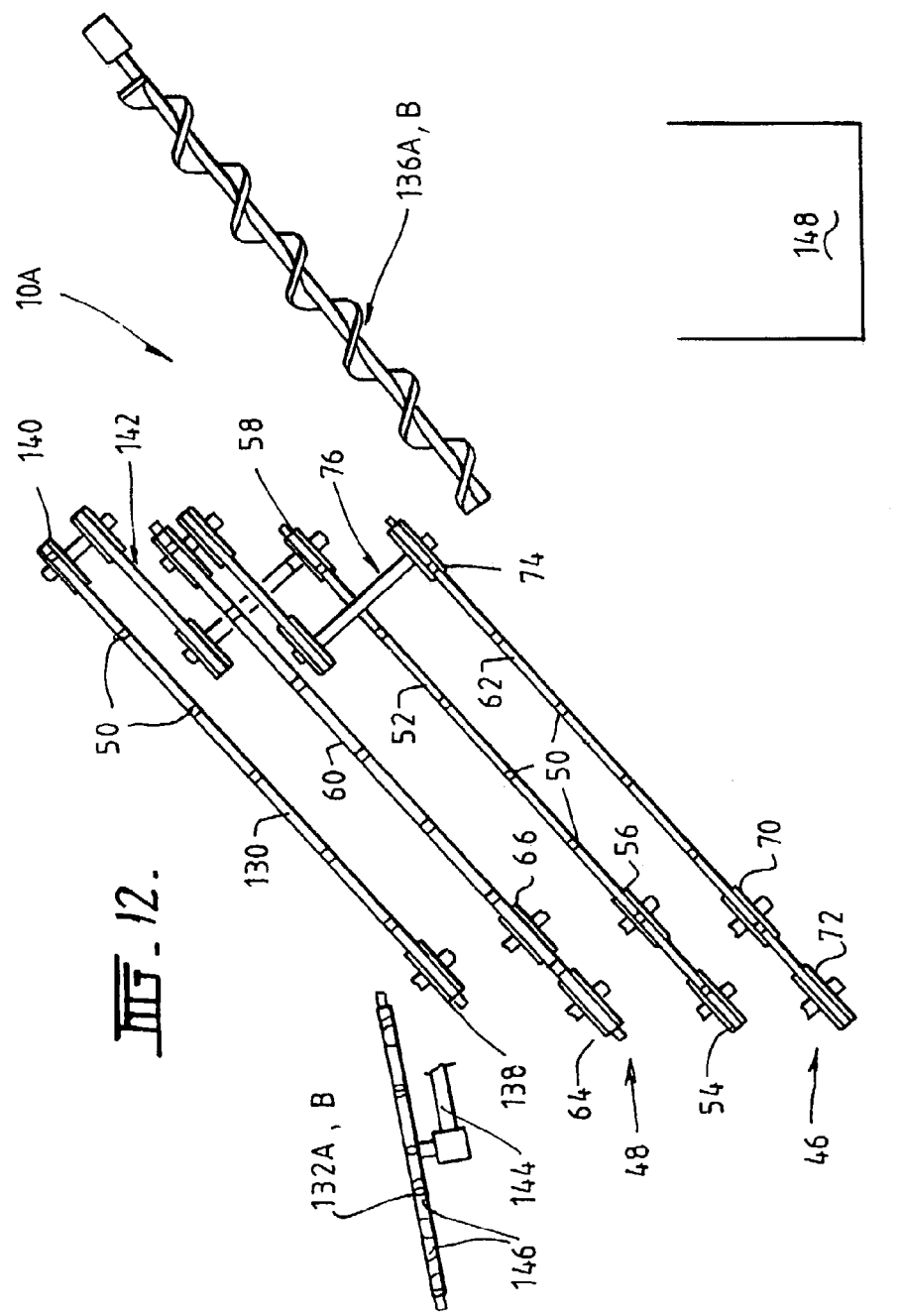
FIG. 12 is a side view of the elevator shown in FIG. 5 with a finger wheel.
Figure 13:
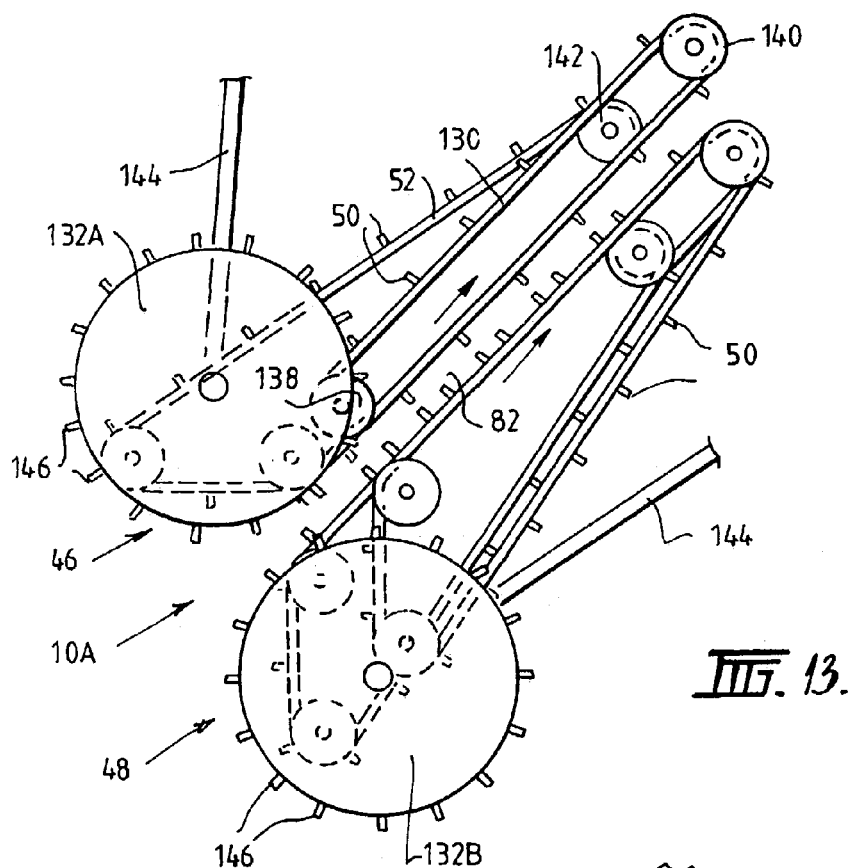
FIG. 13 is a plan view of the elevator shown in FIG. 4 with finger wheels.
Figure 14:
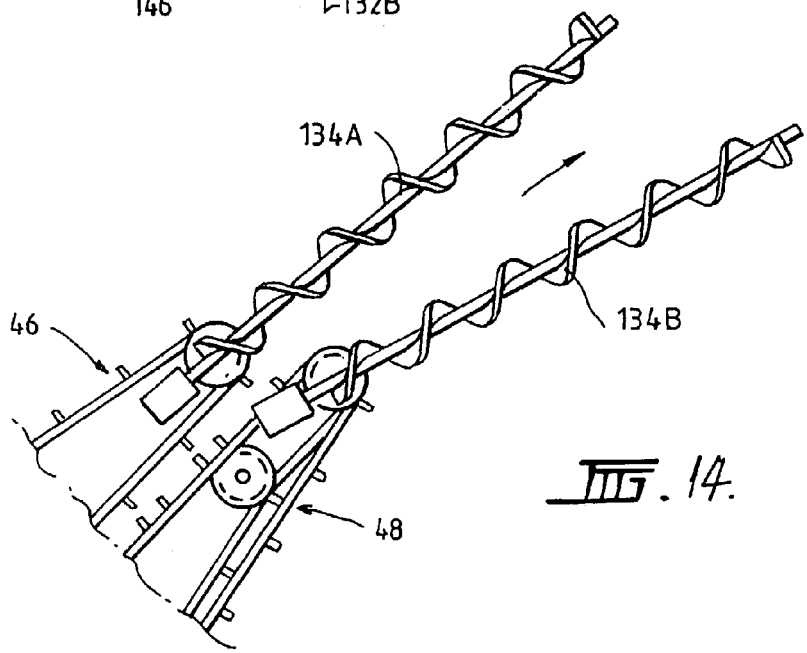
FIG. 14 is a plan view of the elevator shown in FIG. 4 with auger rollers.

A second embodiment of the apparatus 10A with improved tree handling characteristics is depicted in part in FIGS. 12–14. The tree harvesting apparatus 10 depicted in FIGS. 1–11 forms the basis of the apparatus 10A and like numbers are used to denote similar features in the apparatus 10A.

The apparatus 10A differs from apparatus 10 by the inclusion of a further endless loop chain 130 in the first conveyor 46; the addition of spaced apart finger wheels 132A and 132B, upper auger rollers 134A and 134B and lower auger rollers 136A and 136B.

The endless loop chain 130 travels in a path defined by an idler roller 138 and a driven roller 140. The roller 140 is provided with a drive via a transmission 142 coupled with the drive sprocket 58. The chain 130 is in a plane parallel to and above the chains 52 (chain 60 is on the left hand side of the elevator). Fingers 50 extend laterally from the chain 130 for gripping a tree passing through the transporter 16.

The finger wheels 132A and 132B are located on opposite sides of the path 82. Each of the finger wheels is supported on a separate horizontal arm 144 that is able to pivot in a horizontal plane. The arms 144 are biased to direct the wheels 132A, 132B toward each other. The wheels 132A and 132B are also provided with radially extending fingers 146 for engaging the crown of a tree passing through the transporter 16. The wheels 132A and 132B counter-rotate and together with the bias applied to the arms 144 the wheels 132A and 132B work around the crown of a tree and actively push the tree into the transporter 16 as the saw 14 cuts the tree at the base.

The auger rollers 134A, 134B, 136A and 136B from part of the transporter 16 for transporting trees to the chipper 18. The purpose of the auger rollers is to compress the trees together into the chipper feed hopper to form a continuous stream of feed into the chipper feed rollers. The auger rollers are fixed in position above the chipper 18. Each pair counter-rotate so that they pull the trees back into a chipper feed hopper 146 and simultaneously throw the trees down toward the chipper 18.

The top pair of auger rollers 134A and 134B are disposed in a horizontal plane and act about the crown of the tree. As shown most clearly in FIG. 14, the rollers 134A and 134B are divergent so that the spacing between them increases as the tree is pulled further along. Thus a point is reached which the tree is able to pass between the rollers 134A and 134B.

The bottom rollers 136A and 136B are inclined at the same angle as the conveyors 46 and 48 and pull the butt ends of cut trees out from between the conveyors 46 and 48. The speed of the augers 134, 136 is set so that their flights "travel" from front to rear at approximately the same speed as the chains 52, 60, 62 and 130.

Now that an embodiment of the invention has been described in detail it will be apparent to those skilled in the relevant arts that numerous modifications and variations may be made without departing from the basic inventive concepts. For example, the first conveyor 26 can be provided with multiple endless chains (similar to the conveyor 48). Alternatively, the first conveyor 46 can be provided with two endless chains and the second conveyor 48 provided with the single endless chain. Also, although the transporter 16 is shown as configured so as to elevate the cut tree along the inclined path 82, it is possible for the transporter to transport the cut tree without causing its elevation. However, it is preferred to elevate the tree to ensure that it does not engage the ground or any shrubs as it is being transported and also to reduce the overall size of the apparatus 10. Also, the apparatus 10 may be provided with means for allowing adjustment of the height of the saw 14 above the ground. This can be either a manual system such as a screw jack or an automatic system using for example, optical level sensors or strain gauges to provide a feedback signal of the distance between the saw 14 and ground level to subsequently control hydraulic rams for raising and lowering the sub-frame 38 and thus the saw 14. Additionally, the chipping drum 110 can be provided with more than a single cutting blade, with one to four blades being typical. Finally, while the preferred embodiment is described in relation to the harvesting of mallee trees, it may be used for harvesting other types of trees and bushes.

All such modifications and variations are deemed to be within the scope of the present invention, the nature of which is to be determined from the above description.

What is claimed is:

1. A tree harvesting apparatus adapted for mounting on a vehicle to effect continuous tree harvesting, said apparatus comprising:
    a subframe coupled to the vehicle;
    a rotary saw coupled to the subframe for cutting a tree near ground level;
    means for transport coupled to the subframe and adjacent said saw for gripping a tree cut by the saw and transporting the tree to and dropping said cut tree in a means for chipping located at an end of the distant the rotary saw for chipping the tree, said means for transport including first and second opposed means for conveying each provided with laterally extending fingers so that a cut tree is gripped by the fingers of the opposed means for conveying;
    wherein, in use, when said tree harvesting apparatus is mounted on the vehicle and said vehicle driven along a row of trees, said apparatus can continuously cut and chip said trees.

2. A tree harvesting apparatus according to claim 1 wherein means for transport transports said cut tree in a substantially upright orientation along an inclined path to said means for chipping.

3. A tree harvesting apparatus according to claim 2 wherein said rotary saw is a rotary circular saw and is disposed in an inclined plane so that a leading edge of the saw is near ground level and below a trailing edge of the saw.

4. A tree harvesting apparatus according to claim 3 wherein said rotary circular saw has a dished or convexly curved bottom surface for reducing possible contact area between the bottom surface of the saw and the ground.

5. A tree harvesting apparatus according to claim 1 wherein said means for chipping is provided with a rotary chipping drum and an anvil adjacent said chipping drum for directing a cut tree entering said means for chipping onto said chipping drum, the anvil being moveable to vary an angle of incidence of the tree onto the chipping drum.

6. A tree harvesting apparatus according to claim 1 wherein said means for transport includes a first pair of spaced apart horizontally disposed camber rotating auger rollers located at an end of the means for transport nearest said means for chipping between which said cut tree is gripped and advanced toward said chipper.

7. A tree harvesting apparatus according to claim 6 wherein said first pair of auger rollers are divergent to allow a tree to fall therebetween after the tree has been advanced by said auger rollers.

8. A tree harvesting apparatus according to claim 6 wherein the means for transport includes a second pair of spaced apart rollers inclined upwardly from a lower end distant said means for chipping for gripping a trunk of the cut tree and advancing the cut tree to said chipping means.

9. A tree harvesting apparatus according to claim 1 further including a pair of wheels located in advance of said transport means between which a crown of a tree passes prior to the tree being cut by the rotary saw, said wheels biased and pivotally mounted to work around and at least partially compress the crown of the tree.

10. A tree harvesting apparatus adapted for mounting on a vehicle to effect continuous tree harvesting, said apparatus including:
    a rotary saw for cutting a tree near ground level;
    means for transport adjacent said saw for gripping a tree cut by the saw and transporting the tree to and dropping said cut tree in a means for chipping located at an end of the means of transport distant the rotary saw for chipping the tree;
    wherein said transport means includes first and second opposed means for conveying each provided with laterally extending fingers so that a cut tree is gripped by the fingers of the opposed means for conveying;
    wherein said first conveyor means comprises a first endless loop chain from which a plurality of said fingers extend, and said second means for conveying comprises second and third endless chains from each of which a plurality of said fingers extend, said second and third endless chains vertically spaced from each other and wherein the first endless chain is located vertically intermediate said second and third endless chains;
    wherein, in use, when said tree harvesting apparatus is mounted on the vehicle and said vehicle driven along a row of trees, said apparatus can continuously cut and chip said trees.

11. A tree harvesting apparatus according to claim 10 wherein said second means for conveying is coupled to a floating frame that allows said second conveyor means to move relative to said first means for conveying.

12. A tree harvesting apparatus according to claim 11 wherein said floating frame is arranged to allow said second means for conveying to fish tail.

13. A tree harvesting apparatus according to claim 12 wherein said floating frame is further arranged to allow lateral sliding motion of said second means for conveying relative to said first means for conveying.

14. A tree harvesting apparatus adapted for mounting on a vehicle to effect continuous tree harvesting, said apparatus including:
    a subframe coupled to the vehicle;
    a rotary saw coupled to the subframe for cutting a tree near ground level;
    means for transport coupled to the subframe and adjacent said saw for gripping a tree cut by the saw and transporting the tree to and dropping said cut tree in a means for chipping located at an end of the means for transport distant the rotary saw for chipping the tree, said means for chipping being provided with a rotary chipping drum and an anvil adjacent said chipping drum for directing a cut tree entering said chipping means onto said chipping drum, the anvil being moveable to vary an angle of incidence of the tree onto the chipping drum, said means for transport including first and second opposed means for conveying each provided with laterally extending fingers so that a cut tree is gripped by the fingers of the opposed means for conveying;

wherein, in use, when said tree harvesting apparatus is mounted on the vehicle and said vehicle driven along a row of trees, said apparatus can continuously cut and chip said trees.

15. A tree harvesting apparatus according to claim 14 wherein means for transport transports said cut tree in a substantially upright orientation along and inclined path to said means for chipping.

16. A tree harvesting apparatus according to claim 15 wherein said rotary saw is a rotary circular saw and is disposed in an inclined plane so that a leading edge of the saw is near ground level and below a trailing edge of the saw.

17. A tree harvesting apparatus according to claim 16 wherein said rotary circular saw has a dished or convexly curved bottom surface for reducing possible contact area between the bottom surface of the saw and the ground.

18. A tree harvesting apparatus according to claim 14 wherein said first means for conveying comprises a first endless loop chain from which a plurality of said fingers extend, and said second means for conveying comprises second and third endless chains from each of which a plurality of said fingers extend, said second and third endless chains vertically spaced from each other and wherein the first endless chain is located vertically intermediate said second and third endless chains.

19. A tree harvesting apparatus according to claim 18 wherein said second means for conveying is coupled to a floating frame that allows said second conveyor means to move relative to said first means for conveying.

20. A tree harvesting apparatus according to claim 19 wherein said floating frame is arranged to allow said second means for conveying to fish tail.

21. A tree harvesting apparatus according to claim 20 wherein said floating frame is further arranged to allow lateral sliding motion of said second conveyor means relative to said first means for conveying.

22. A tree harvesting apparatus according to claim 14 wherein said means for transport includes a first pair of spaced apart horizontally disposed camber rotating auger rollers located at an end of the means for transport nearest said means for chipping between which said cut tree is gripped and advanced toward said means for chipping.

23. A tree harvesting apparatus according to claim 22 wherein said first pair of auger rollers are divergent to allow a tree to fall therebetween after the tree has been advanced by said auger rollers.

24. A tree harvesting apparatus according to claim 22 wherein the means for transport includes a second pair of spaced apart rollers inclined upwardly from a lower end distant said means for chipping for gripping a trunk of the cut tree and advancing the cut tree to said means for chipping.

25. A tree harvesting apparatus according to claim 14 further including a pair of wheels located in advance of said means for transport between which a crown of a tree passes prior to the tree being cut by the rotary saw, said wheels biased and pivotally mounted to work around and at least partially compress the crown of the tree.

26. A tree harvesting apparatus according to claim 14 further including a pivot arm pivotally coupled about an axis of rotation of said chipping drum, said anvil being carried by said pivot arm whereby, pivoting of said pivot arm about said axis varies said angle of incidence.

27. A tree harvesting apparatus according to claim 26 further including a pair of telescopically related plates, a remote end of a distant one of said plates pivoted to an fixed point and an adjacent end of a proximal one of said plates coupled to said pivot arm adjacent said anvil.

28. A tree harvesting apparatus adapted for mounting on a vehicle to effect continuous tree harvesting, said apparatus comprising:

a subframe coupled to the vehicle;
a rotary saw coupled to the subframe for cutting a tree near ground level;
a transporter coupled to the subframe and adjacent said saw that grips a tree cut by the saw and transports the tree to, and drops said cut tree in, a chipper located at an end of the transporter distant the rotary saw for chipping the tree, said chipper being provided with a rotary chipping drum and an anvil adjacent said chipping drum for directing a cut tree entering said chipper onto said chipping drum, the anvil being moveable to vary an angle of incidence of the tree onto the chipping drum, the transporter comprising first and second opposed conveyors each provided with laterally extending fingers between which a cut tree is gripped and where said first conveyor comprises a first endless loop chain from which a plurality of said fingers extend, and said second conveyor comprises second and third endless chains from each of which a plurality of said fingers extend, said second and third endless chains vertically spaced from each other and wherein the first endless chain is located vertically intermediate said second and third endless chains.

29. A tree harvesting apparatus according to claim 28 wherein transporter transports said cut tree in a substantially upright orientation along an inclined path to said chipper.

30. A tree harvesting apparatus according to claim 29 wherein said rotary saw is a rotary circular saw and is disposed in an inclined plane so that a leading edge of the saw is near ground level and below a trailing edge of the saw.

31. A tree harvesting apparatus according to claim 30 wherein said second conveyor is coupled to a floating frame that allows said second conveyor to move relative to said first conveyor.

32. A tree harvesting apparatus according to claim 31 wherein said floating frame is arranged to allow said second conveyor to fish tail.

33. A tree harvesting apparatus according to claim 32 wherein said floating frame is further arranged to allow lateral sliding motion of said second conveyor relative to said first conveyor.

34. A tree harvesting method comprising:
providing a vehicle with a rotary saw, a transporter and a chipper, the chipper further provided with a rotary chipping drum;
providing the transporter with first and second opposed conveyors each provided with laterally extending fingers between which a cut tree is gripped;
cutting a tree near ground level with the rotary saw;
operating the transporter to transport the cut tree to the chipper;
dropping the cut tree into the chipper; and,
directing the cut tree onto the rotary chipping drum to chip the cut tree.

35. A method according to claim 34 further comprising:
providing the chipper with a movable anvil adjacent the chipping drum and moving the anvil to vary an angle of incidence of the cut tree onto the chipping drum.

36. The method according to claim 34 wherein the transporter transports the cut tree in a substantially upright orientation along an inclined path to the chipper.

37. The method according to claim 34 further comprising disposing the rotary saw in an inclined plane with a leading edge of the rotary saw being near ground level and below a trailing edge of the rotary saw.

38. The method according to claim 34 further comprising providing the first conveyor with a first endless loop chain from which a plurality of said fingers extend, and wherein the second conveyor is provided with second and third endless chains from which a further plurality of said fingers extend, the second and third endless chains being vertically spaced from each other and the first endless chain being located vertically intermediate the second and third endless chains.

39. The method according to claim 38 further comprising coupling the second conveyor to a floating frame whereby the second conveyor is able to move relative to the first conveyor.

* * * * *